United States Patent
Imani et al.

(10) Patent No.: US 12,360,988 B1
(45) Date of Patent: Jul. 15, 2025

(54) AUTOMATIC QUERY LANGUAGE GENERATION FOR SPECIALIZED QUERY LANGUAGE BASED ON NATURAL LANGUAGE SEARCH

(71) Applicant: Anomali Incorporated, Redwood City, CA (US)

(72) Inventors: Mohsen Imani, Flower Mound, TX (US); Yizheng Zhou, San Mateo, CA (US)

(73) Assignee: Anomali Incorporated, Redwood City, CA (US)

( * ) Notice: Subject to any disclaimer, the term of this patent is extended or adjusted under 35 U.S.C. 154(b) by 0 days.

(21) Appl. No.: 19/041,915

(22) Filed: Jan. 30, 2025

Related U.S. Application Data

(60) Provisional application No. 63/723,772, filed on Nov. 22, 2024, provisional application No. 63/723,794, filed on Nov. 22, 2024.

(51) Int. Cl.
| | |
|---|---|
| *G06F 7/00* | (2006.01) |
| *G06F 16/242* | (2019.01) |
| *G06F 16/248* | (2019.01) |
| *G06F 40/205* | (2020.01) |
| *G06F 40/40* | (2020.01) |

(52) U.S. Cl.
CPC .......... *G06F 16/243* (2019.01); *G06F 16/244* (2019.01); *G06F 16/248* (2019.01); *G06F 40/205* (2020.01); *G06F 40/40* (2020.01)

(58) Field of Classification Search
CPC .... G06F 16/243; G06F 16/244; G06F 16/248; G06F 16/35; G06F 16/93; G06F 16/258; G06F 16/285; G06F 16/00; G06F 16/334; G06F 16/9024; G06F 16/358; G06F 16/382; G06F 16/345; G06F 16/182; G06F 40/49; G06F 40/205; G06F 40/289; G06F 40/40
See application file for complete search history.

(56) References Cited

U.S. PATENT DOCUMENTS

| | | | |
|---|---|---|---|
| 9,589,060 B1* | 3/2017 | MacGillivray | ... G06F 16/24522 |
| 9,881,088 B1* | 1/2018 | Leber | ..... G06F 16/951 |
| 2005/0228639 A1* | 10/2005 | Abe | ........ G06F 40/242 |
| | | | 704/7 |
| 2006/0184476 A1* | 8/2006 | Kemper | ............ G06F 16/90332 |
| | | | 704/E15.044 |
| 2011/0004618 A1* | 1/2011 | Chaudhary | ......... G06F 16/3331 |
| | | | 707/769 |

* cited by examiner

*Primary Examiner* — Mohammad A Sana
(74) *Attorney, Agent, or Firm* — Fenwick & West LLP

(57) ABSTRACT

A query building tool receives user input of a natural language query by way of a search interface and decomposes the natural language query into sections. The tool prompts a large language model to, for each section, search a portion of a grammar of a query language having a corresponding query type for each section and construct a query language prompt corresponding to the section. The tool aggregates each query language prompt into an aggregated query language prompt, executes a search using the aggregated query language prompt, and outputs for display using the search interface search results for the natural language query.

20 Claims, 7 Drawing Sheets

Search

Saved Search ⌄ | -- What are the top 10 source types? | ⊘ Last 2 years ⌄ | 🔍 Search Query: Save | Saved as | Manage

410

Learn AQL    Result    Visualization

Natural Language Examples    ✿ Copilot

-- Have I been affected by MoveIt?

-- List 100 allow or accept events. Show fields action, src, src_port, dest, dest_port, bytes_in and bytes_out -- Show me logins for users in the last hour.

-- What are the top 100 destination hosts on my network?

-- What are the top 10 source types?

-- Show me all Errors with a category of d4ex coming from Match Cloud

-- Show me all logs where the user is srutherford

-- Show me the results coming from 89.19.92.176

[Run]

Anomali Query Language (AQL) Examples

1 | aggr count as cnt by sourcetype
2 | sort cnt desc
3 | limit 10 -- show tope 10 source types 1 | where action in ('allow', 'accept')
2 | fields action, src, src_port, dest, dest_port, bytes_in, bytes_out
3 | limit 100 -- list 100 allow or accept events. show fields action, src, src_port, dest, dest_port, bytes_in and bytes_out 1 | where sourcetype contains "crowdstrike" and event_name contains "LogonFailed"
2 | timetrend count as event_count by user span=12hr
3 | sort event_count des

*FIG. 4A*

Search

| Saved Search ▾ | 1 eventlog \| top sourcetype \| limit 10 \| |
| | 2 -- What are the tope 10 source types |

🕒 Last 2 years ▾   🔍 Search

Query: Save \| Saved as \| Manage

Learn AQL   Result   Visualization

10 Results 201,655,100,722 Scanned (12 Seconds) Job ○    ✱

25 ▾    1-10 of 10 results    ‹ Prev [1] ▾ Next ›    ⚙

| SOURCETYPE ≡ | COUNT_ ≡ | PERCENT_ ≡ |
|---|---|---|
| › aws_vpc_flow | 8,953,204,179 | 86.038 |
| › suricata | 776,909,196 | 7.456 |
| › aws_cloudtrail | 292,510,913 | 2.811 |
| › crowdstrike_fdr | 175,016,730 | 1.682 |
| › pan:traffic | 101,354,692 | 0.974 |
| › aws_vpc_dns | 41,952,866 | 0.403 |
| › netflow | 22,253,450 | 0.214 |
| › haproxy | 18,325,761 | 0.176 |
| › gworkspace | 12,587,836 | 0.121 |
| › ULink: vCenter-RWC | 11,979,214 | 0.115 |

*FIG. 4B*

Search

410

Saved Search ⌄ | ⊙ Last 7 days ⌄ | 🔍 Search

1 | aggr count as cnt by sourcetype
2 | sort cnt desc
3 | limit 10 -- show top 10 source types Query: Save | Saved as | Manage

FIG. 5

AUTOMATIC QUERY LANGUAGE GENERATION FOR SPECIALIZED QUERY LANGUAGE BASED ON NATURAL LANGUAGE SEARCH

CROSS REFERENCE TO RELATED APPLICATIONS

This application claims the benefit of priority to U.S. Provisional Patent Application Nos. 63/723,772, 63/723,790, and 63/723,794, filed on Nov. 22, 2024, which are incorporated herein by reference in their entirety for all purposes.

TECHNICAL FIELD

This disclosure generally relates to machine learning, and more particularly relates to bespoke query language building performed by large language models.

BACKGROUND

When users wish to query a traditional database using a traditional query language, large language models may be able to construct useful queries for the user. This is because myriad data exists about those traditional query languages (e.g., millions of examples of drafted code and what that code yielded, literature and textbooks about how to draft in that code, etc.). SQL is an example of a traditional query language. However, traditional query languages are not useful in all scenarios. For example, proprietary databases have, in many cases, collected myriad data of non-standard structure. Because the structure is non-standard, traditional query language does not have, without modification, a grammar useable to query those proprietary databases.

As an example, a service monitoring for cybersecurity threats over the course of decades produces billions or trillions or more of data entries and files relating to encountered and discovered cybersecurity threats. However, when this monitoring began and data entries and files are created and stored, it was not clear how this information would be used in the future. Accordingly, services may create custom query languages having their own custom grammar for searching this trove of data. Large language models do not, in these scenarios, have sufficient examples to accurate construct queries using these novel query languages.

SUMMARY

The systems and methods disclosed herein enable usage of large language models to build queries from natural language search requests using custom query languages. In order to achieve this, the natural language search requests are broken down into sections that correspond to disparate portions of a grammar for a custom query language. This enables a large language model to be prompted to return a query language prompt for each section, while ensuring accuracy and eliminating a possibility of hallucination, as the scope of search for the proper query language is limited to a small section of the grammar. Each section's corresponding query language can then be aggregated to a prompt, which can be used to run a search in the custom query language for what is needed.

In some embodiments, a query building tool receives user input of a natural language query by way of a search interface and decomposes the natural language query into sections. The tool prompts a large language model to, for each section, search a portion of a grammar of a query language having a corresponding query type for each section and construct a query language prompt corresponding to the section. The tool aggregates each query language prompt into an aggregated query language prompt, executes a search using the aggregated query language prompt, and outputs for display using the search interface search results for the natural language query.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system environment for implementing a query building tool, in accordance with an embodiment.

FIGS. 4A and 4B illustrate a sequence of user interfaces as a natural language query is converted into query language for a search, in accordance with an embodiment.

FIG. 5 illustrates a selective treatment of natural language text as either a comment or a natural language query, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
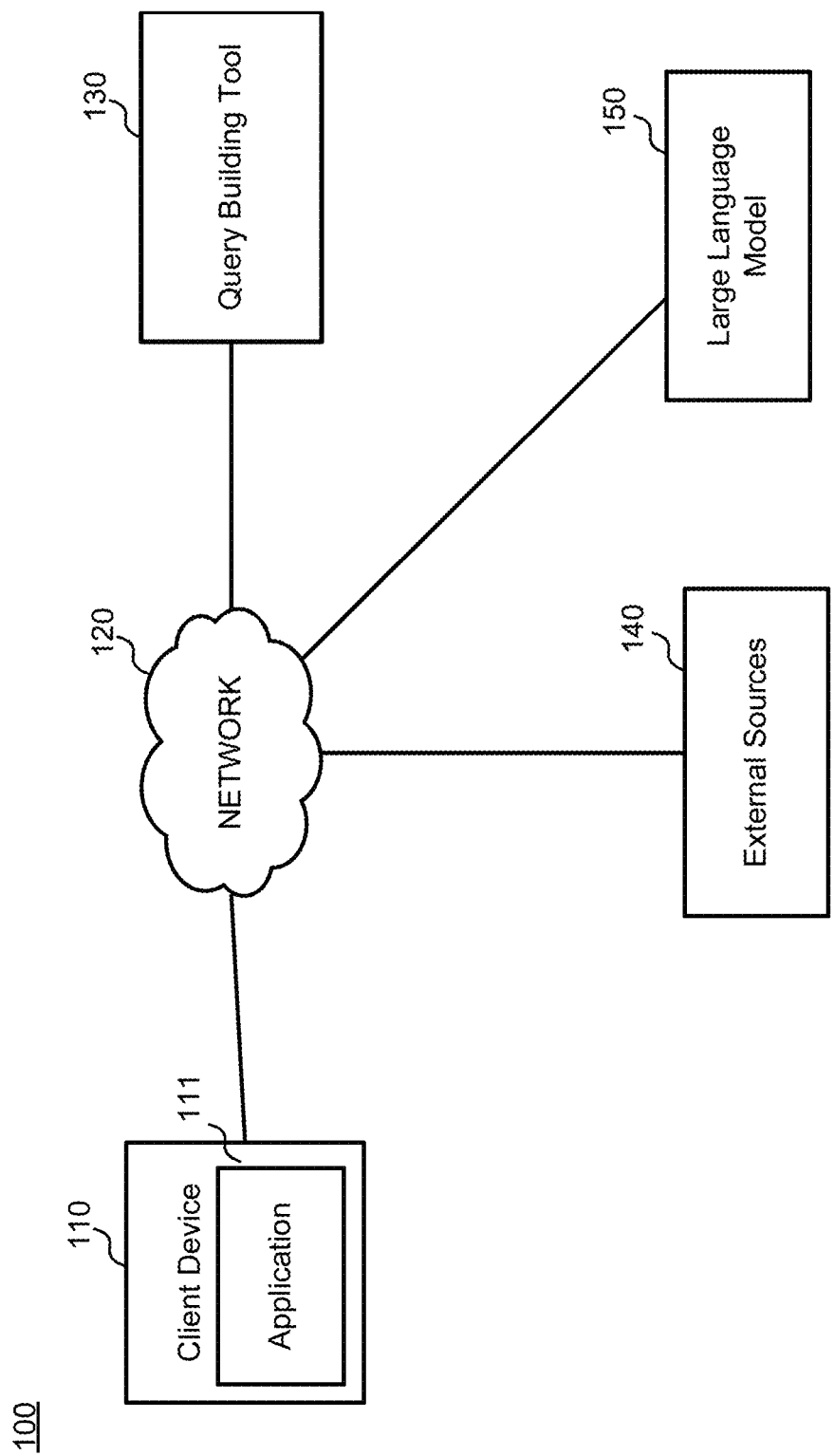

Figure (FIG. 1 illustrates one embodiment of a system environment for implementing a query building tool, in accordance with an embodiment. As depicted in FIG. 1, environment 100 includes various devices, including client device 110, network 120, query building tool 130, external sources 140, and large language model service 150. A tool, as used herein, is a collection of one or more cloud resources that together, perhaps in coordination with other entities such as application 111, form a client-facing tool.

Query building tool 130 is used by client devices 110 to build queries (e.g., using a non-standard query language)

based on a natural language query. Client device 110 may, by way of application 111, interface with query building tool 130. Application 111 is an application installed on client device 110 and/or accessible by way of a browser of client device 110. Some or all functionality of query building tool 130 described herein may be distributed or fully performed by application 111 on a client device, or vice versa. Where reference is made herein to activity performed by application 111, it equally applies that query building tool 130 may perform that activity off of the client device, and vice versa. Further details about the operation of query building tool 130 are described below with reference to FIG. 2.

Network 120 may be any network or combination of networks, such as the Internet, a wireless and/or wired network, a local area network, a wideband network, or any other data communications means that facilitates communications between devices, services, and sources disclosed herein.

External sources 140 include data sources used by query building tool 130 in order to output search results after a query is built. This may include specialized databases, such as a threat intelligence database storing data relating to known threats. While external sources 140 are referred to as external, where referenced, internal sources may also be analyzed that are stored within the set of servers that form query building tool 130. Databases may be divided into any number of tables. For example, a database that logs network activity might have tables relating to events (e.g., login events, request events, etc.), certain types of information (e.g., threat intelligence information, observability information, etc.), and so on.

Large language model (LLM) service 150 may be any service or combination of services that provide large language models (e.g., OpenAI, Llama3, etc.). In some embodiments, query building tool 130 may have its own internal large language model service 150 and need not use an external large language model service. Large language model(s) are trained by query building tool 130 to generate bespoke query language (e.g., for querying one or more specialized databases), as is described in further detail below with respect to FIGS. 2-6. To achieve this, query building tool 130 trains the large language models to identify relevant data structures and relevant portions of the data structures in order to train the large language model to infer the correct data structure for a given question. As an example, in the query "Show me the top 10 events," the relevant data structure is an "event" table. As another example, in the query "Show me top 10 actors," the relevant data structure is a "threat intelligence" table.

To train a LLM to identify the correct data structure corresponding to a given specialized database, query building tool 130 prompts the LLM with data structure schemas (e.g., table schemas), descriptions of the data structures (e.g., tables), and a wide range of examples to enable it to infer the correct data structure for a given question. The data structures may each correspond to a portion of data or representation, category, or type of data from a database that is to be searched.

For some databases, various fields may be categorical, meaning those fields have a small, predefined set of values. For example, a gender field might have predefined values of "Male" or "Female". As another example, a ranking field might have predefined integer values of an integer between 1 and 10. The LLM is be trained through prompting by query building tool 130 to use these specific values to avoid incorrect or inconsistent ones, such as M, F, or other unexpected inputs. After categorical fields are identified, query building tool 130 inserts the predefined field values into a vector database for easy retrieval. This process ensures that field values in queries are consistent with a database's categorical constraints.

Figure 2:
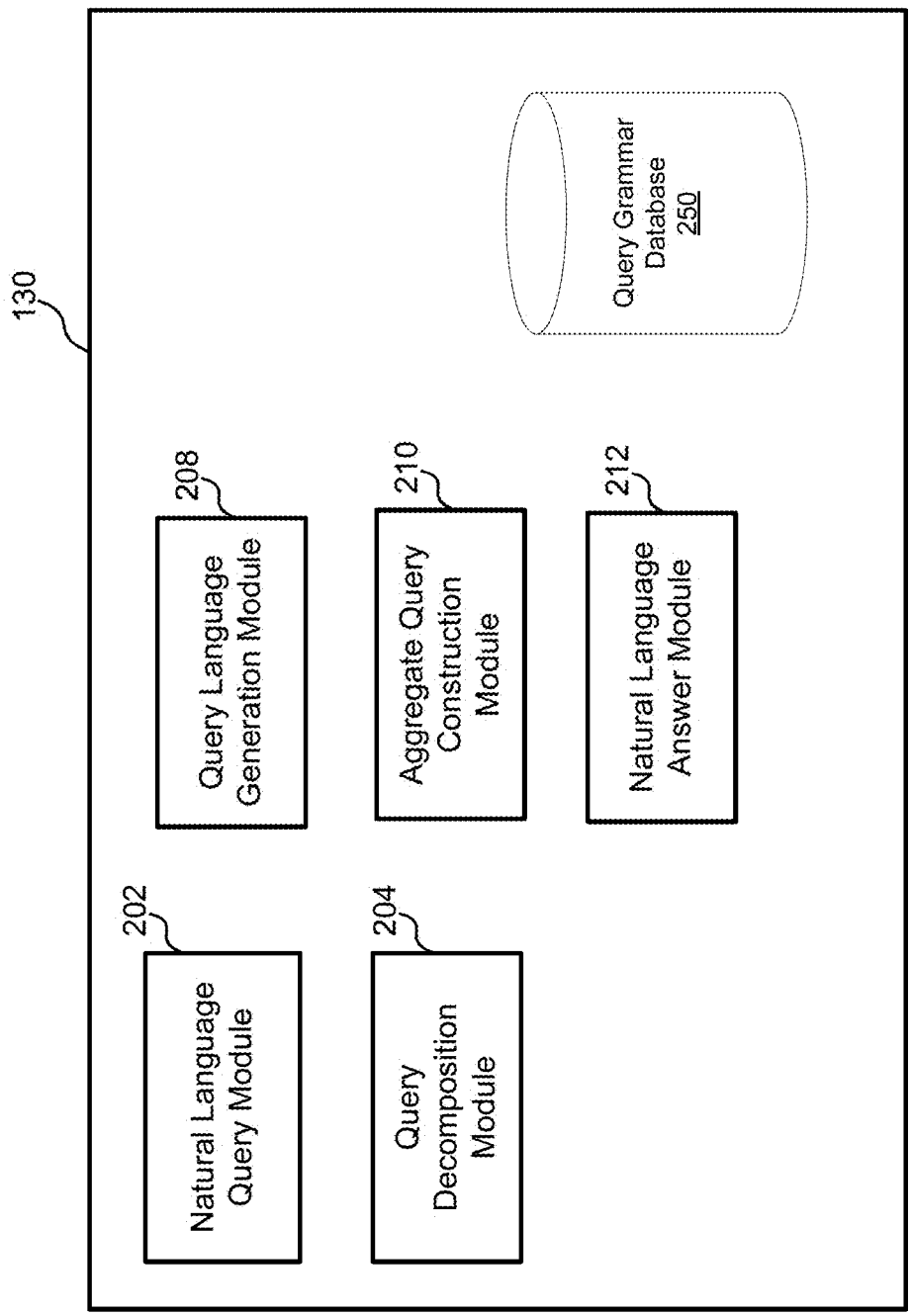
FIG. 2 illustrates one embodiment of exemplary modules of the query building tool, in accordance with an embodiment.

FIG. 2 illustrates one embodiment of exemplary modules of the query building tool, in accordance with an embodiment. As depicted in FIG. 2, query building tool 130 includes natural language query module 202, query decomposition module 204, query language generation module 208, aggregate query construction module 210, natural language answer module 212, and query grammar database 250. These modules and databases are merely illustrative; fewer or more modules and/or databases may be used to achieve the functionality disclosed herein.

Natural language query module 202 receives user input of a natural language query by way of a search interface. In some embodiments, the user input may additionally or alternatively include a natural language search, a query written in a query language, and/or a combination thereof. The query may relate to, for example, threat hunting. A threat hunter for an entity may write, "What are the top 10 source types?". Additional information may be specified, such as a database to search (e.g., a default database is pre-selected, or a database selected by a user from a plurality of candidate databases), a timeframe (e.g., within the last 2 years; within the last 3 hours, etc.), and any other search constraints and/or filters. Exemplary queries are shown in FIGS. 4 and 5 that relate to threat hunting, though queries may be about any topic.

Query decomposition module 204 decomposes the natural language query into sections. Query decomposition module 204 may decompose the natural language query by inputting the natural language query into a model (e.g., a machine learning model trained to classify each portion of the natural language query into a section), and receiving, as output from the model, a delineation of different sections of the natural language query. In an embodiment, the model may be an LLM, and query decomposition module 204 may prompt the LLM to identify a relevant table for a natural language query in a specialized database, where the LLM is trained to do so based on the training mechanism described with respect to FIG. 1. Query decomposition module 204 may similarly prompt the LLM to predict an operation type (e.g., top, where, etc.) required for the query or a portion thereof, and any other information about the query.

For example, a slice of the natural language query may be a filtering operator (e.g., "top" in "top 10 source types" indicating to retrieve a subset of information). A prompt to the large language model may be to determine what type of operator "top" is, as top is segmented as an operator, and the large language model may return that it is a filtering operator. In an embodiment, the large language model may be trained with examples of natural language as labeled by query type (e.g., "top" labeled as a filtering operator). In an embodiment, a supervised machine learning model may be the model, having keywords, sets of keywords, strings, templates that match strings, etc., labeled by query type.

As can be seen, prompts may be iterative, where a sequence of prompts may include first prompting an LLM to break the query into sections (e.g., operators like "top", data types like "source", etc.). The sequence may then include further refining, within each section, what is within the section (e.g., a prompt can state that "it is resolved now that "top" is an operator, but in order to obtain an accurate query build, we will need to know what kind of operator "top" is. Please determine the kind of operator "top" is."). Query decomposition module 204 may reference one or more hierarchical tables to determine whether a section is resolved down to a leaf node of a categorization tree, and may iteratively prompt the LLM based on the hierarchical table until a leaf node categorization is determined for each section, where each leaf nodes represent lowest level query building categories for each type of candidate query reflected within a grammar.

Query language generation module 208 prompts a large language model to, for each section, search a portion of a grammar of a query language having the corresponding query type and construct a query language prompt corresponding to the section. The search may be limited to just the portion in order to ensure that errant queries are not hallucinated based on the search. Query grammar database 250 may store a grammar for a query language, such as a proprietary query language. One exemplary proprietary query language may be an Anomali Query Language, which is designed to search for cybersecurity threats through a proprietary bespoke database. However, any query language any specialized database may be used. The grammar database may be divided into subsets of grammar, each of the subsets corresponding to a different query type. That is, a section of the database may include filtering operators, another section may include aggregation operators, and so on. This enables a large language model to search a small subset of data in order to form a query, reducing or eliminating the likelihood of a hallucinated and inaccurate query language string being returned by the large language model. The concepts disclosed herein apply to any custom query language having insufficient exemplars for a large language model to produce queries accurately based on a single request.

Aggregate query construction module 210 strings together a large query based on each of the section-oriented query language that was returned by the large language model. This can be performed by concatenating the queries (e.g., concatenating to search (1) event logs for (2) only up to ten of (3) the top source types detected in the event logs, to be described with respect to FIG. 4B). This results in an aggregation of each query language prompt into an aggregated query language prompt. Natural language answer module 212 then executes a search using the aggregated query language prompt (e.g., by querying a database, such as a threat database, with the generated query language), and outputting for display using the search interface search results for the natural language query.

Users who are proficient in writing code in a custom query language may not always want to have query building tool 130 write all of a query. A dynamic tool that selectively writes query language depending on what is expressed in users' natural language search results in an improved user interface that intelligently decides whether or not to automatically generate query language. To this end, a user may input query language and/or natural language as part of an input field, and query building tool 130 may then resolve whether or not to generate query language.

To this end, query building tool 130 may dynamically determine whether natural language appears in a same input along with query language. Where they appear together, query building tool 130 may resolve that the user is proficient in the query language, and may not automatically generate a query from the natural language. A more refined approach may be made, where query building tool 130 receives input of a natural language string and a query language input (e.g., together on a same line). Responsive to detecting the query language input in a same line as the natural language input, query building tool 130 determines not to treat the natural language input as a given natural language query. This determination may be performed according to a heuristic (e.g., treat natural language on a same line as a query as a comment, and treat natural language on its own line as a request to build a query). In other scenarios, query building tool 130 may prompt a large language model to determine, based on given input and possibly other parameters (e.g., historical interaction of a user, whether the user previously wrote in query language, whether query language present in an input was cut and paste from a prior output from query building tool 130 and therefore does not reflect a proficiency), whether or not a query should be built based on this input. In this way, an improved user interface is realized, where natural language is ignored when accompanied by query language or otherwise resolved as not useful, and used to signal a need to generate query language where it is not accompanied by query language or is otherwise determined to be useful, enabling a user to author comments (e.g., to explain or document their search process) and to perform natural language queries on a same interface.

Computing Machine Architecture

Figure 3:
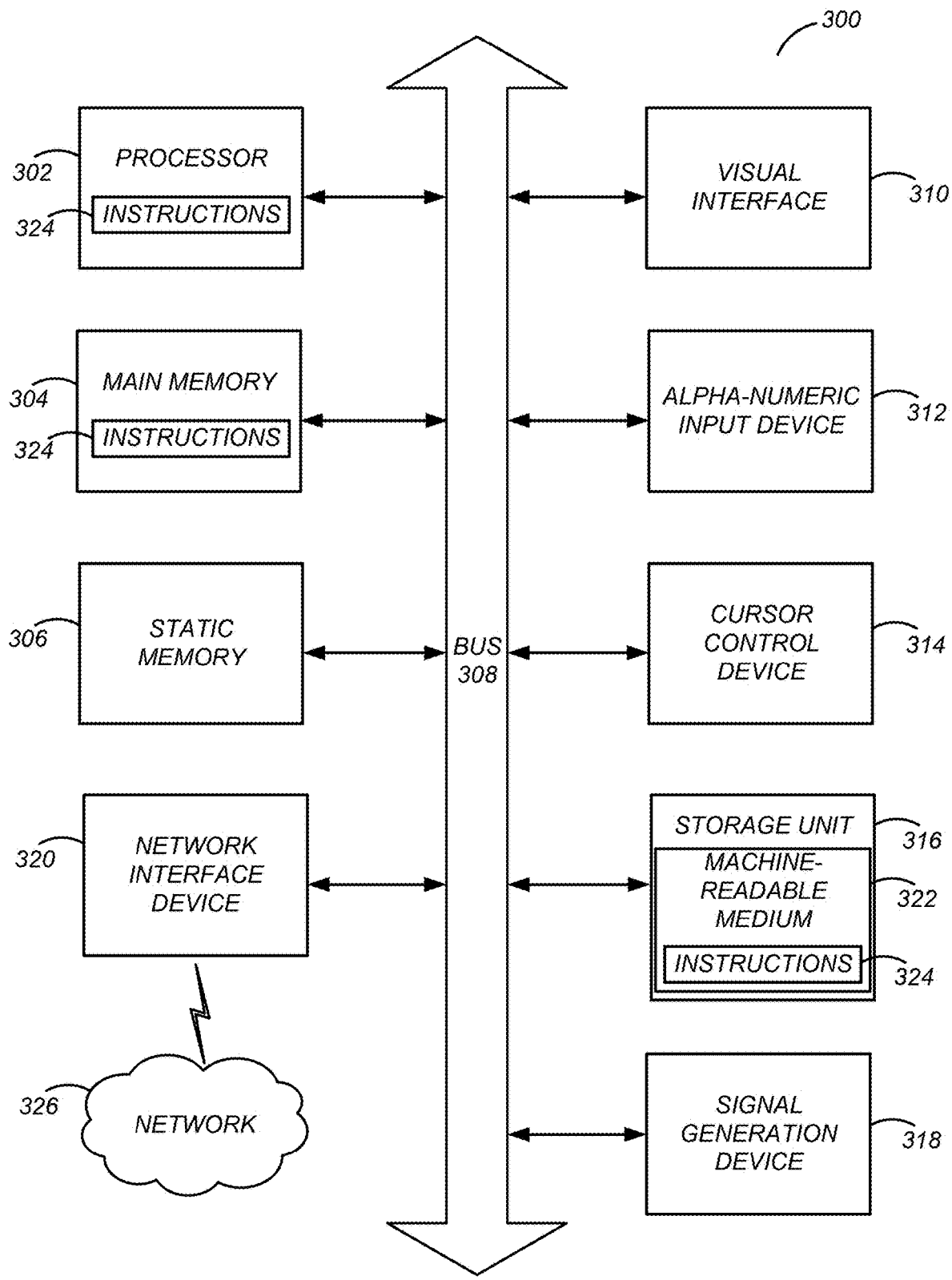
FIG. 3 is a block diagram illustrating components of an example machine able to read instructions from a machine-readable medium and execute them in a processor (or controller).

FIG. (FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alphanumeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for implementing a task-oriented recommendation service through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Exemplary Use Cases

FIGS. 4A and 4B illustrate a sequence of user interfaces as a natural language query is converted into query language for a search, in accordance with an embodiment. As depicted in FIG. 4A, a user inputs into user interface 410 (e.g., by typing or selecting from examples "What are the top 10 source types?"). The user may be a representative of an entity having data with many source types used by the entity, which may form a context for the question. The user may specify a time bound of the last two years for the search. Turning to FIG. 4B, query building tool 130 may decompose the query into sections, obtain query language for each section (e.g., each sections query language shown separated in the example query in FIG. 4B), and aggregate the query to perform a search, where the results are shown at the bottom of FIG. 4B.

As another exemplary query, a query may be "Show me all actions from Palo Alto logs". Query building tool 130 may infer using the trained LLM that the relevant table to the query in the specialized database is an "event" table that stores action events. Query building tool 130 may determine that the predicted operation is "top". From the vector database, query building tool 130 may retrieve a source value pan: log that constricts to categorical log values. The final query may read: event_table|where source='pan:log'|top action.

FIG. 5 illustrates a selective treatment of natural language text as either a comment or a natural language query, in accordance with an embodiment. As shown in FIG. 5, user interface 510 has a query where a user types three lines. On line 3, query language "limit 10" is shown, adjacent to "show top 10 source types". The "show top 10 source types" natural language is ignored and is simply explanatory. However, if the "limit 10" were removed from the query, then the natural language query would be converted into a query language query in the manner disclosed in the foregoing.

Figure 6:
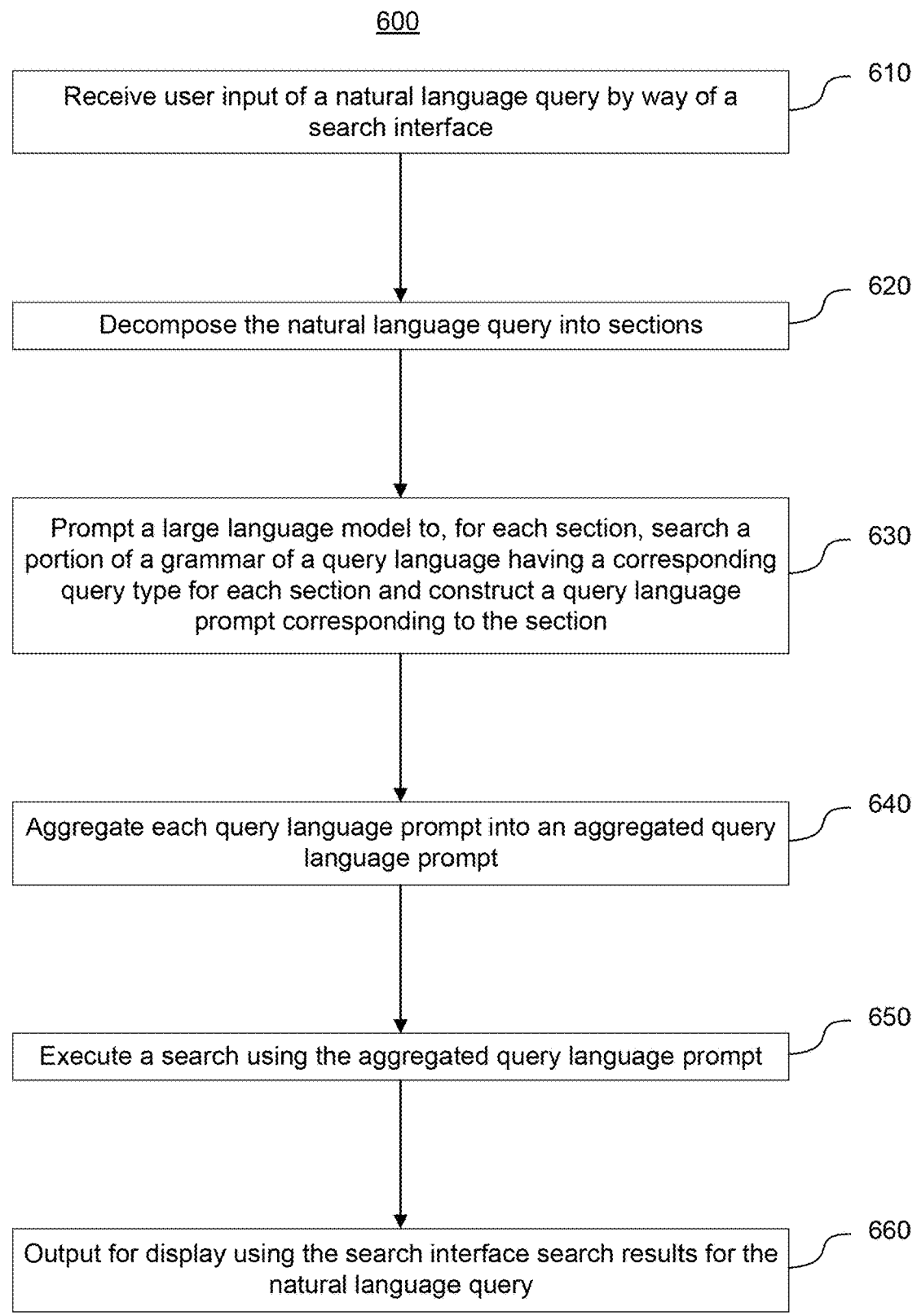
FIG. 6 a flowchart of a process for generating custom query language prompts for a natural language search, in accordance with an embodiment.

FIG. 6 a flowchart of a process for generating custom query language prompts for a natural language search, in accordance with an embodiment. Process 600 may be executed by one or more processors (e.g., processor 302) executing instructions (e.g., 324) store on memory of non-transitory media (e.g., 304). The one or more processors may cause various modules of query building tool 130 to execute the instructions. Process 600 may begin with query building tool 130 receiving 610 user input of a natural language query by way of a search interface (e.g., using natural language query module 202). Query building tool 130 decomposes 620 the natural language query into sections (e.g., using query decomposition module 204), and prompts 630 a large language model to, for each section, search a portion of a grammar of a query language having a corresponding query type for each section and construct a query language prompt corresponding to the section (e.g., using query language generation module 208).

Query building tool 130 aggregates 640 each query language prompt into an aggregated query language prompt (e.g., using aggregate query construction module 210). Query building tool 130 executes 650 a search using the aggregated query language prompt, and outputs 660 for display using the search interface search results for the natural language query (e.g., using natural language answer module 212).

What is claimed is:

1. A method comprising:
   receiving user input of a natural language query by way of a search interface;
   decomposing the natural language query into sections;
   prompting a large language model to, for each section, search a portion of a grammar of a query language having a corresponding query type for each section and construct a query language prompt corresponding to the section;
   aggregating each query language prompt into an aggregated query language prompt;
   executing a search using the aggregated query language prompt; and
   outputting for display using the search interface search results for the natural language query.

2. The method of claim 1, wherein decomposing the natural language query into sections comprises:
   inputting the natural language query into a model; and
   receiving, as output from the model, a delineation of different sections of the natural language query.

3. The method of claim 1, wherein determining a corresponding query type for each section comprises:
   inputting each section into the large language model along with a prompt to determine each corresponding query type; and
   receiving, from the large language model, each corresponding query type.

4. The method of claim 3, wherein the large language model is trained with examples of natural language as labeled by query type.

5. The method of claim 1, wherein the grammar is divided into subsets of grammar, each of the subsets corresponding to a different query type.

6. The method of claim 5, wherein each portion of the grammar that is searched is a subset of the subsets of grammar that corresponds to the query type of a section being searched.

7. The method of claim 1, wherein the query language is a non-standard query language.

8. The method of claim 1, further comprising:
   receiving input of a natural language string and a query language input; and
   responsive to detecting the query language input in a same line as the natural language input, determining not to treat the natural language input as a given natural language query.

9. A non-transitory computer-readable medium comprising memory with instructions encoded thereon, the instructions, when executed by one or more processors, causing the one or more processors to perform operations, the instructions comprising instructions to:
   receive user input of a natural language query by way of a search interface;
   decompose the natural language query into sections;
   prompt a large language model to, for each section, search a portion of a grammar of a query language having a corresponding query type for each section and construct a query language prompt corresponding to the section;
   aggregate each query language prompt into an aggregated query language prompt;
   execute a search using the aggregated query language prompt; and
   output for display using the search interface search results for the natural language query.

10. The non-transitory computer-readable medium of claim 9, wherein the instructions to decompose the natural language query into sections comprise instructions to:
    input the natural language query into a model; and
    receive, as output from the model, a delineation of different sections of the natural language query.

11. The non-transitory computer-readable medium of claim 9, wherein the instructions to determine a corresponding query type for each section comprise instructions to:
    input each section into the large language model along with a prompt to determine each corresponding query type; and
    receive, from the large language model, each corresponding query type.

12. The non-transitory computer-readable medium of claim 11, wherein the large language model is trained with examples of natural language as labeled by query type.

13. The non-transitory computer-readable medium of claim 9, wherein the grammar is divided into subsets of grammar, each of the subsets corresponding to a different query type.

14. The non-transitory computer-readable medium of claim 13, wherein each portion of the grammar that is searched is a subset of the subsets of grammar that corresponds to the query type of a section being searched.

15. The non-transitory computer-readable medium of claim 9, wherein the query language is a non-standard query language.

16. The non-transitory computer-readable medium of claim 9, the instructions further comprising instructions to:
    receive input of a natural language string and a query language input; and responsive to detecting the query language input in a same line as the natural language input, determine not to treat the natural language input as a given natural language query.

17. A system comprising:

memory with instructions encoded thereon; and one or more processors that, when executing the instructions, are caused to perform operations comprising:

receiving user input of a natural language query by way of a search interface;

decomposing the natural language query into sections;

prompting a large language model to, for each section, search a portion of a grammar of a query language having a corresponding query type for each section and construct a query language prompt corresponding to the section;

aggregating each query language prompt into an aggregated query language prompt;

executing a search using the aggregated query language prompt; and outputting for display using the search interface search results for the natural language query.

18. The system of claim 17, wherein decomposing the natural language query into sections comprises:

inputting the natural language query into a model; and receiving, as output from the model, a delineation of different sections of the natural language query.

19. The system of claim 17, wherein determining a corresponding query type for each section comprises:

inputting each section into the large language model along with a prompt to determine each corresponding query type; and receiving, from the large language model, each corresponding query type.

20. The system of claim 19, wherein the large language model is trained with examples of natural language as labeled by query type.

* * * * *